United States Patent [19]

Matsuno et al.

[11] Patent Number: 4,803,401
[45] Date of Patent: Feb. 7, 1989

[54] COMPACT FLUORESCENT LAMP

[75] Inventors: Hiromitsu Matsuno, Hachioji; Tetsuo Ono; Seiichi Murayama, both of Kokubunji, all of Japan

[73] Assignee: Hitachi, Ltd., Tokyo, Japan

[21] Appl. No.: 886,238

[22] Filed: Jul. 16, 1986

[30] Foreign Application Priority Data

Jul. 19, 1985 [JP] Japan .................. 60-158177

[51] Int. Cl.4 .................. H01J 61/35; H01J 61/42
[52] U.S. Cl. .................. 313/489; 313/493
[58] Field of Search .................. 313/493, 489; 427/67 (U.S. only)

[56] References Cited

U.S. PATENT DOCUMENTS

| 2,706,691 | 4/1955 | Schaefer | 427/67 |
| 3,205,394 | 9/1965 | Ray | 313/493 X |
| 3,377,494 | 4/1968 | Repsher et al. | 313/489 |
| 3,514,276 | 5/1970 | Fujio et al. | 427/67 X |
| 4,587,453 | 5/1986 | Ono et al. | 313/493 X |

FOREIGN PATENT DOCUMENTS 57253 4/1983 Japan .
180953 10/1984 Japan .

Primary Examiner—Palmer C. DeMeo
Attorney, Agent, or Firm—Antonelli, Terry & Wands

[57] ABSTRACT

Disclosed is a compact fluorescent lamp which comprises an airtight outer bulb filled with a rare gas and mercury; inner tube means provided within the outer bulb, said means having opening to a space of the inside of the outer bulb, and a coating formed onto at least one of an inner surface of said outer bulb and an outer surface of said inner tube means, said coating being so transparent as substantially not to scater visible rays and which consists of at least one material of an oxide and a phosphate.

A compact fluorescent lamp mostly in the electric bulb shape of the present invention has been remarkably improved in the so-called lumen output maintenance without lowering of the initial lumen output.

11 Claims, 2 Drawing Sheets 1,9 : GLASS
10 : PHOSPHOR COATING
11 : TRANSPARENT COATING
8 : PLASMA F I G. 1
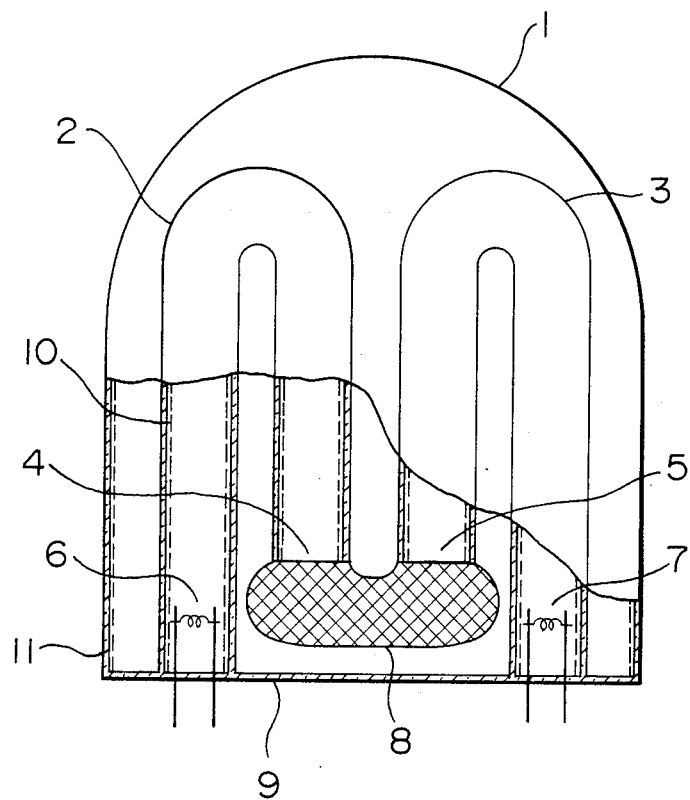
1, 9 : GLASS
10 : PHOSPHOR COATING
11 : TRANSPARENT COATING
8 : PLASMA

1 : GLASS 14, 11, 12 : TRANSPARENT COATING

8 : PLASMA

COMPACT FLUORESCENT LAMP

BACKGROUND OF THE INVENTION

The present invention relates to improvements in compact fluorescent lamps, and, more particularly, relates to improvements of the fluorescent lamps of this type in which darkening of the surfaces of outer bulbs and/or inner tube means is prevented, thereby to improve lumen output maintenance of the lamps.

Recently, fluorescent lamps with an Edison type base which can be directly inserted in Edison-base-sockets, i.e., so-called compact fluorescent lamps, have been extensively developed. Of these compact fluorescent lamps, there has been known, as disclosed for example in U.S. Pat. No. 4,199,708, a compact fluorescent lamp which comprises an outer bulb filled with a rare gas and mercury, and U-shaped inner tube means enclosed in the outer bulb, the inner tube means having their respective one ends formed with openings opened to the space inside the outer bulb and their respective other ends provided with electrodes. The above-mentioned fluorescent lamp is advantageous in that a high lumen output can be obtained without enlarging its diameter and without diminishing efficiency because the vapor pressure of mercury depends on the temperature of the outer bulb. The initial characteristics of the fluorescent lamp are satisfactory. Such a fluorescent lamp is, however, disadvantageous in that when the fluorescent lamp is used for a long time, the inner surface of the outer bulb and the outer surfaces of the inner tube means become darkened, so that the lumen output is decreased and so-called lumen output maintenance deteriorates.

On the other hand, U.S. Pat. No. 4,199,708 describes that light dispersing material, such as finely dispersed $Ca_2P_2O_7$ or $TiO_2$, is provided on the inner surface of the outer bulb to scatter visible rays radiated from the inner tube means. Further, Japanese Patent Unexamined Publication No. 57253/1983 describes that selective light transmitting material, such as $CoO$, $Al_2O_3$ or $TiO_2$, is provided on the inner surface of the outer bulb or the inner surfaces of the inner tube means to transmit specific wave lengths of rays. Furthermore, Japanese Patent Unexamined Publication No. 180953/1984 describes that the outer surfaces of the inner tube means are partly coated with 6 $\mu m$ thick $Al_2O_3$ with particle diameter of about 0.02 $\mu m$ to prevent darkening of the interior tubes. Each of these conventional examples is advantageous in improving the non-darkening characteristic of the inner surface of the outer bulb or the outer surfaces of the inner tube means and in improving lumen output maintenance. However, each of these conventional examples is disadvantageous in that initial lumen output becomes lowered because the material provided on the inner surface of the outer bulb or on the outer surfaces of the inner tube means scatters or absorbs visible rays.

SUMMARY OF THE INVENTION

An object of the present invention is therefore to provide a compact fluorescent lamp which comprises an airtight outer bulb enclosing therein a rare gas, mercury, and inner tube means each having an opening opened to a space of the inside of the airtight outer bulb, and which is improved in so-called lumen output maintenance, i.e., the initial lumen output is large and the lumen output is not diminished after use for a long period of time.

To attain the foregoing object, the compact fluorescent lamp of the present invention is constructed such that at least one of the inner surface of the outer bulb and the outer surface of the inner tube means is covered with a transparent coating which is formed of at least one of an oxide (that is, metal or non-metal oxide) and a phosphate and which do not substantially diffuse visible rays.

Such a featured construction according to the invention makes it possible to provide a compact fluorescent lamp which is superior in lumen output maintenance.

BRIEF DESCRIPTION OF THE DRAWINGS

FIG. 1 is a vertically sectional view showing structure of the compact fluorescent lamp according to the present invention, in which inner tube means having the respective openings are enclosed in an airtight outer bulb;

DESCRIPTION OF THE PREFERRED EMBODIMENTS

Figure 2:
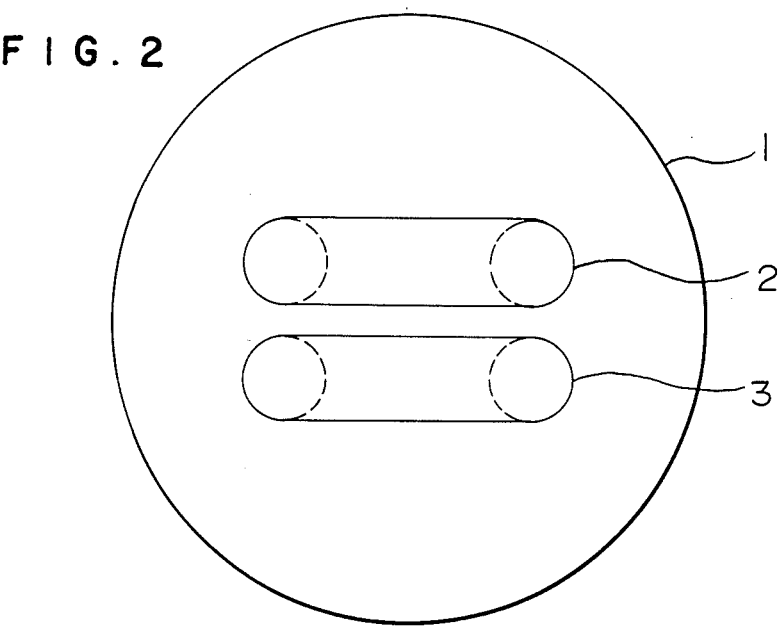
FIG. 2 is a plan view of another embodiment of the compact fluorescent lamp according to the present invention.

First, the principle of the present invention will be now described with reference to FIG. 1.

The inventors of this application have examined, from various viewpoints, conventional compact fluorescent lamps in which lumen output maintenance is lowered after use over a long period. As the result, it has been found that one of causes of reduction in lumen output maintenance is darkening of the inner surface of an outer bulb 1 and, more particularly, darkening of a portion of the inner surface in the close vicinity to opening ends 4 and 5 of inner tube means 2 and 3. Although the composition of the outer bulb 1 has been changed variously within the range of so-called soft glass, the darkening has been produced at all times.

The inventors have examined the darkened portion in detail by use of an ion microprobe mass analyzer and the like. As the result, it has been found that mercury is always detected corresponding to the darkening. In short, it has been found that the darkening is caused by the permeation of mercury into the glass of the bulb.

As is known well, mercury in the form of atoms never enters into glass. However, with respect to the compact fluorescent lamp in which mercury, rare gas and the inner tube means 2 and 3 having the opening ends 4 and 5 are enclosed in the airtight outer bulb 1, it is considered that the opening ends 4 and 5 are connected to each other by the plasma 8 so that mercury ions in the plasma 8 diffuse into the glass surface of the outer bulb 1 and permeate into glass.

As described above, it has been found that reduction in lumen output maintenance due to the darkening of the outer bulb 1 is a phenomenon peculiar to such compact fluorescent lamps in which mercury, a rare gas and inner tube means 2 and 3 having opening ends 4 and 5 are enclosed in an airtight outer bulb 1.

The inventors have applied various kinds of coatings on the inner surface of the outer bulb 1 and investigated the lumen output maintenance in every case. As the result of investigation, the inventors have found that the lumen output maintenance is remarkably improved in the case where the coating is composed of an oxide and/or a phosphate. Particularly, the improvement is excellent in the case where the oxide is an oxide of at least one metal selected from the group consisting of Al, Ti, Mg and Zr, or an oxide of at least one non-metal selected from the group consisting of Si and B, and the phosphate is $Ca_2P_2O_7$.

The reason why the improvement can be effected is that the above-mentioned materials are thermally and chemically stable and do not allow the mercury ions to permeate thereinto so that such darkening as seen in the untreated glass can not be produced.

The coating was formed by a process of coating the inner surface of the outer bulb with a slurry prepared by dispersing an oxide or a phosphate having a particle diameter of 20 m$\mu$m or more in water. In order to reduce the darkening of the outer bulb sufficiently, it was necessary that the thickness of the coating was more than 1 $\mu$m. On the other hand, when the coating of oxide or phosphate having a particle diameter of 20 m$\mu$m or more was provided to a thickness of 1 $\mu$m or more, it was found that darkening of the outer bulb was not produced but initial lumen output was lowered by several percent. When the coating was provided as described above, total transmittance of visible rays was not lowered but the visible rays were scattered so that direct transmittance thereof was lowered. In short, the outer bulb was changed into such a stable condition as frosted glass. Accordingly, it is considered that visible rays radiated from the inner tube means are scattered by the coating and partly returned to the inner tube means to be absorbed into the electrodes or the like, so as to cause lowering of initial lumen output.

The inventors have found that when the foregoing coating was replaced by a transparent coating substantially not scattering visible rays, darkening of the outer bulb as well as lowering of initial lumen output did not occur.

The term "transparent coating substantially not scattering visible rays" means a coating which makes it possible to read therethrough 10 point type letters written with black color and disposed at a distance of 10 mm vertically from the surfaces of the coating when the letters are illuminated with 300 lux. If visible rays are scattered, the coating becomes like frosted glass, thereby to make it difficult to read the letters.

The oxide- and/or phosphate-transparent coating not scattering visible rays was formed by a method comprising the steps of coating the inner surface of the outer bulb with organo-metal compound solutions, and baking the coating in the air. The thus formed coating was non-crystalline and dense, and accordingly, substantially did not scatter visible rays and was transparent. Because the coating was very dense, it was extremely effective to prevent mercury ion from permeating into the glass compared with the coating formed by lamination of relatively large particles of oxide or phosphate as described above. Accordingly, the coating having a thickness of 0.05 $\mu$m to 0.5 $\mu$m could sufficiently prevent darkening of glass. As described above, it is possible to reduce the thickness of the oxide- or phosphate-transparent coating, so that the transmittance of the coating can be more improved.

In the compact fluorescent lamp in which a rare gas, mercury and inner tube means having opening ends are enclosed in an airtight outer bulb, it is apparent from the above-mentioned principle that not only the inner surface of the outer bulb but also the outer surfaces of the inner tube means become darkened. Accordingly, the lumen output maintenance is further improved if oxide- and/or phosphate-transparent coatings are formed on the respective outer surfaces of the inner tube means. In the case where the outer surfaces of the inner tube means are coated with oxide- or phosphate-particles having a diameter of about 20 m$\mu$m, the coatings are so weak as to fall down easily and can not be used in practice. However, oxide- and/or phosphate-transparent coatings are so dense as not to fall down during the usual process for manufacturing lamps.

Furthermore, in order to improve lumen output maintenance, the oxide- and/or phosphate-transparent coatings can be provided onto both of the inner surface of the outer bulb and the outer surfaces of the inner tube means.

Embodiments of the present invention will be described now with reference to FIGS. 1 to 3. FIG. 1 shows an embodiment of the compact fluorescent lamp of the present invention, in which mercury, argon and inner tube means 2 and 3 are enclosed in a cylindrical airtight outer bulb 1, the inner tube means 2 and 3 having openings 4 and 5 at their respective one ends and electrodes 6 and 7 at their respective other ends. Each of the interior tubes 2 and 3 was made of lead glass in the form of a U-shape. In this example, the inner diameter of the respective inner tube means is selected to be 11 mm and the total length along the tube axis was selected to be 130 mm. The inner surface of the respective inner tube means was coated with a mixture of $Y_2O_3$:Eu and $LaPO_4$:Ce, Tb as a phosphor 10.

In the above-mentioned compact fluorescent lamp, a $SiO_2$ transparent coating 11 was formed on the inner surface of the outer bulb 1. Silicon alkoxides were applied on the inner surface of the outer bulb 1 and then baked in the air so as to be formed into the $SiO_2$ transparent coating 11 substantially not scattering visible rays. The average thickness of the coating 11 was 0.2 $\mu$m. Owing to the provision of the $SiO_2$ coatings substantially not scattering visible rays, lowering of output did not occur in direct transmittance as well as in initial lumen output in the outer bulb 1. After the compact fluorescent lamp was lit with a lamp wattage of about 15 W for 2000 hours, lumen output maintenance was found to be 80%, showing an improvement by 4%, compared with the conventional compact fluorescent lamp provided with no transparent coating on the inner surface of the outer bulb.

Figure 3:
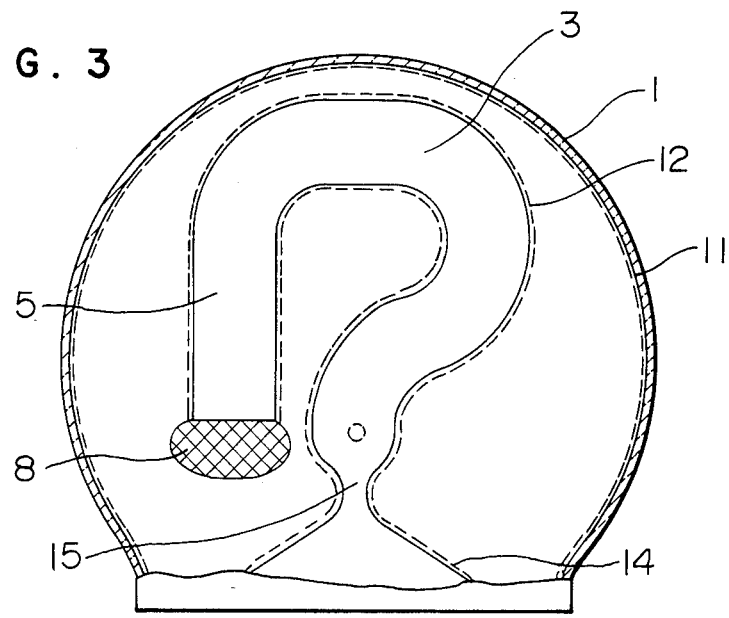
FIG. 3 is a front view of the same embodiment of FIG. 2.

FIGS. 2 and 3 are a plan view and a front view respectively, showing another embodiment of the present invention, in which inner tube means 2 and 3 each having a shape like a question mark and each sealed by a so-called flare type stem 15 are enclosed in a spherical outer bulb 1. An $SiO_2 \cdot B_2O_3$ transparent coating 11 substantially not scattering visible rays was formed on an inner surface of the outer bulb 1 and $SiO_2 \cdot B_2O_3$ transparent coatings 14 of the same construction substantially not scattering visible rays were formed on the respective outer surfaces of the inner tube means 2 and 3 and the flare type stem 15. The addition of $B_2O_3$ was advantageous in improving adhesive strength of the coatings.

Initial lumen output in the above-mentioned compact fluorescent lamp was equivalent to that in the case where the coatings 11 and 14 were not provided. Lumen output maintenance after lighting for 2000 hours was found to be 83%, showing an improvement of 7%, compared with the case where no transparent coatings were provided.

Other than those described above, as the material for the transparent coatings substantially not scattering visible rays, it has been proved that a metal oxide such as $Al_2O_3$, $TiO_2$, $ZrO_2$ and $MgO$, a mixture thereof such as $ZrO_2$, $SiO_2$, and a phosphate compound can be used with equal effect.

As described above, according to the present invention, it is possible to provide a compact fluorescent lamp which is superior in lumen output maintenance without lowering of initial lumen output.

What is claimed is:

1. A compact fluorescent lamp comprising an airtight outer bulb filled with a rare gas and mercury, inner tube means provided within said outer bulb, said inner tube means having opening to a space of the inside of said outer bulb, said inner tube means including therein electrodes spaced apart from each other, the inner tube means having an inner surface, the inner surface of the inner tube means being coated with phosphor material; and a coating formed on at least one of an inner surface of said outer bulb and an outer surface of each of said inner tube means, said coating being so transparent as substantially not to scatter visible rays and which consists of at least one material selected from the group consisting of an oxide and a phosphate, visible rays produced in said lamp not being substantially scattered or diffused by the lamp, whereby reduction in lumen output maintenance in the course of time is avoided while providing an initial lumen output that is not lowered as compared to that of a lamp without said coating.

2. A compact fluorescent lamp according to claim 1, in which said oxide is an oxide of at least one element selected from the group consisting of Al, Ti, Si, Mg, Zr and B.

3. A compact fluorescent lamp according to claim 1, in which said phosphate is $Ca_2P_2O_7$.

4. A compact fluorescent lamp according to claim 1, in which said coating has a thickness of from 0.05 μm to 0.5 μm.

5. A compact fluorescent lamp according to claim 4, wherein said coating, having a thickness of from 0.05 μm to 0.5μm, is sufficiently dense so as to prevent mercury ions, formed from the mercury in the airtight outer bulb, from permeating into glass of the at least one of the outer bulb and inner tube means which is provided with the coating.

6. A compact fluorescent lamp according to claim 1, in which said coating is a coating formed by coating at least one of the inner surface of said outer bulb and the outer surface of each of said inner tube means with organo-metal compound solutions from which said at least one material is formed, and baking the coating so as to form said at least one material.

7. A compact fluorescent lamp according to claim 1, wherein said coating is non-crystalline.

8. A compact fluorescent lamp according to claim 1, wherein said coating is provided on said outer surface of each of the inner tube means.

9. A compact fluorescent lamp according to claim 1, wherein said coating is provided on both said inner surface of said outer bulb and said outer surface of each of said inner tube means.

10. A compact fluorescent lamp according to claim 1, in which said coating is formed of $SiO_2$ and $B_2O_3$.

11. A compact fluorescent lamp according to claim 1, wherein said coating is sufficiently dense so as to prevent mercury ions, formed from the mercury in the airtight outer bulb, from permeating into glass of the at least one of the outer bulb and inner tube means which is provided with the coating.

* * * * *